Patented Sept. 23, 1952

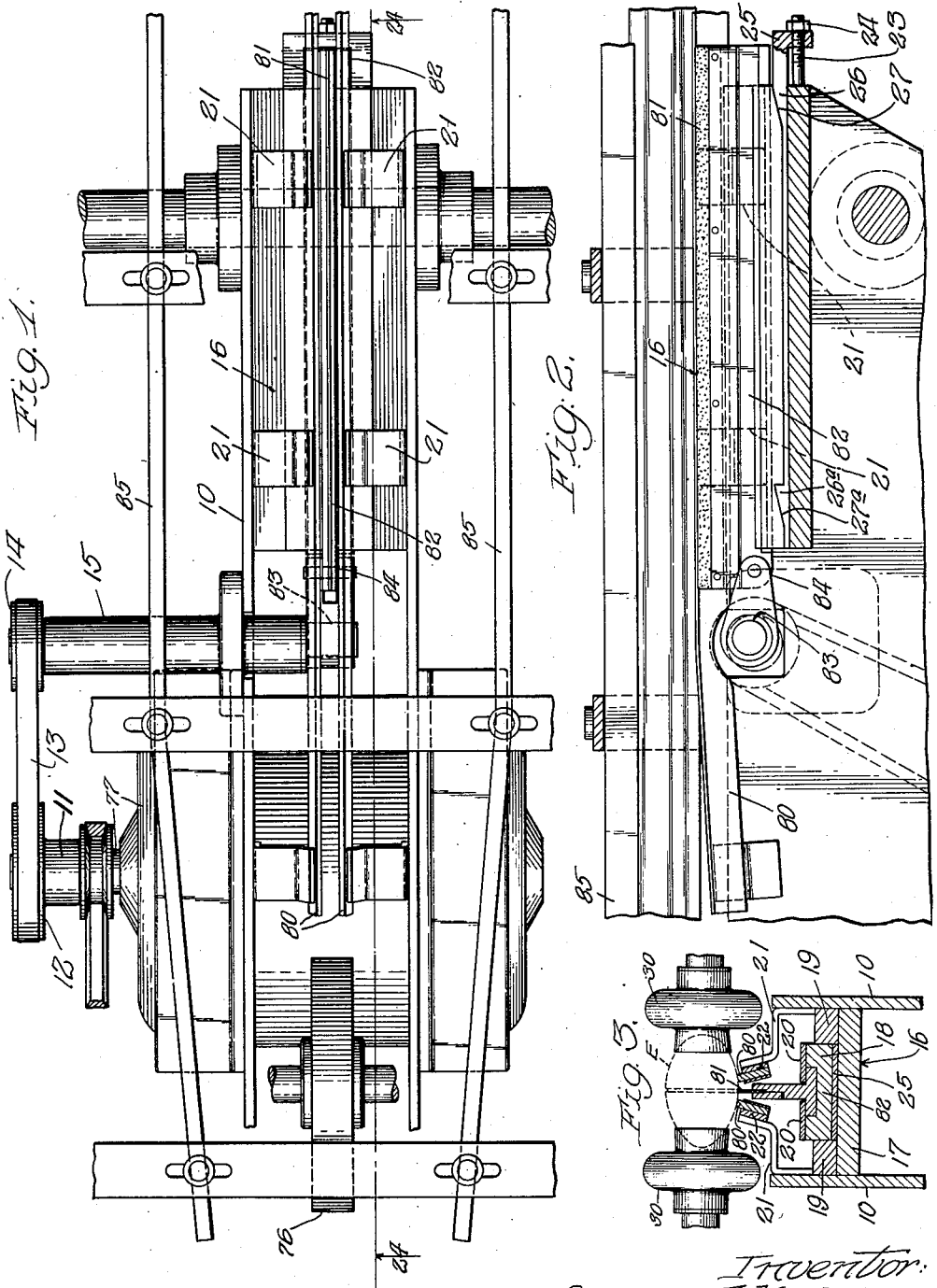

2,611,409

UNITED STATES PATENT OFFICE 2,611,409

EGGSHELL SCORING DEVICE

George F. Hodson, Altus, Okla., and Lyman L. Campbell, Riverdale, Ill., assignors to Wilson & Company, Inc., a corporation of Delaware Application September 4, 1945, Serial No. 614,303

10 Claims. (Cl. 146—221)

1

The present invention relates to an egg scoring device and more particularly to a device for scoring eggs in an egg breaking machine.

The invention is adapted for use in an egg breaking machine such as that illustrated in the patent of George F. Hodson, 2,443,188, issued June 15, 1948.

An object of the invention is to provide a device which will score or cut through the shell of an egg without breaking the membrane thereof. This is most desirable as it results in the disposal or removal of all shell particles prior to the cutting of the membrane and eliminates the possibility of the mixing of shell particles with the contents of the egg.

Other objects, advantages and features of the invention will be apparent from the following specification and the drawings, in which:

Fig. 1 is a top plan view of an embodiment of the invention and the part of an egg breaking machine with which it is used.

Fig. 2 is a sectional view taken on the line 24—24 of Fig. 1.

Fig. 3 is a transverse view partly in section of the scoring device in operation.

In the embodiment of the invention shown in the drawings, 10 represents the parallel frame members of the egg breaking machine on which the egg scoring device is mounted. Also mounted in or suspended from this frame is a motor 77, the shaft 11 of which is connected by pulley 12 and belt 13 to pulley 14 on one end of a shaft 15 supported by a frame member 10. At its other end, the shaft 15 is provided with an eccentric cam 83 which is connected by an enclosing strap and link to a lug 84 on the carriage 82 for the scoring stone 81.

This carriage is mounted on a carriage support 16 comprising a base member 17 which is secured between the two upright frame members 10 and above which is a track member 18 with a longitudinal groove formed in its upper surface for receiving the base of the carriage 82 and forming a track in which the carriage rides. The carriage is of inverted T-shaped cross section and the stone 81 is secured in a groove in its upper end. Bars 19 space the member 18 from the frame members 10 and strips 20 are attached to the top of the member 18 to retain the carriage in the groove or track in said member. Mounted in pairs on the bars 19 and secured to the uprights 10 are support brackets 21 which are bent toward each other and then upwardly and at their upper end are provided with attaching means 22 for the guide rails

2

80. These guide rails are preferably of hard rubber and converge upwardly to provide a cradle for an egg E. Extending from the end of the base member 17 of the carriage support is a stud 23 on which is secured by a nut 24 a positioning member 25, having two cam surfaces 26, 26a thereon which are complementary to the cam surfaces 27, 27a on the member 18. The positioning member thereby provides an adjustable support for the member 18. By sliding the positioning member on the stud, the member 18 and with it the carriage 82 may be raised or lowered to adjust the cutting depth of the stone.

Each egg is held between a pair of rotatable vacuum cups 30 mounted on endless chains (not shown) in the frame 10 and which are more fully described in our copending application Serial No. 604,326, filed July 11, 1945. As each egg is advanced in the machine, it frictionally engages the guides 80 which cause the egg and the vacuum cups to rotate while at the same time the scoring stone contacts the central portion or equator of the egg. The scoring stone is reciprocated at a very high rate as, for example, 2,000 cycles per minute, but the amount of movement thereof is preferably quite small, as, for example, one-eighth inch.

The top of the scoring stone is about even with the top of the guides, but being at the equator of the egg (which is a very slight distance below the point contacted by the guides), will score or cut the shell through (see Fig. 3), but will not penetrate beyond the shell sufficiently to cut the membrane so that the shell particles will not be mixed with the contents of the egg.

While we have shown and described certain embodiments of our invention, it is to be understood that it is capable of many modifications. Changes, therefore, in the construction and arrangements may be made without departing from the spirit and scope of the invention as disclosed in the appended claims.

We claim:

1. A shell scoring device for an egg breaking machine comprising a carriage, a support for the carriage, a pair of spaced parallel guides mounted on the support, means for moving an egg along said guides, a scoring device mounted on the carriage intermediate the guides, and means for reciprocating the carriage on the support to cause the scoring device to score the egg shell, said guides being adapted to contact said egg to rotate the same over the scoring device.

2. The shell scoring device of claim 1 wherein said guides and said scoring device are substantially linear members lying in substantially the same plane.

3. The shell scoring device of claim 1 in which said means for moving the eggs includes a grasping means to grasp an egg by its polar ends whereby to present the equatorial portion of the egg to said scoring device.

4. The shell scoring device of claim 3 including means for adjusting the height of the carriage.

5. The shell scoring device of claim 3 in which each of said guides is provided with a rubber egg contacting rail.

6. A shell scoring device for an egg breaking machine comprising a carriage, a support for the carriage provided with a groove in its upper surface for receiving said carriage, a pair of spaced parallel guide rails mounted on the support above the carriage, means for moving an egg along said rails including a grasping means to grasp the egg by its polar ends, a scoring device mounted on the carriage intermediate the guide rails, and means for reciprocating the carriage on the support to cause the scoring device to score the egg shell along its equatorial portion, said rails being adapted to contact said egg to rotate the same over the scoring device.

7. A shell scoring device for an egg breaking machine comprising a scoring blade, means for rotating the egg about its polar axis with the equatorial portion of an egg in contact with the blade, means for reciprocating the blade at a high rate of speed and with a short length of stroke and means for gauging the depth of cut of the blade whereby to score the shell without cutting the membrane of the egg.

8. The device of claim 7 in which the length of the stroke is approximately one eighth inch.

9. The method for scoring an egg to cut through the shell without rupturing the membrane which comprises rotating the egg while in contact with a scoring device positioned at substantially the equator of the egg while reciprocating the device at a high rate of speed and with a length of stroke shorter than the elastic limit of the membrane to be exposed by such scoring.

10. A shell scoring device for an egg breaking machine comprising a scoring blade, means for rotating the egg about its polar axis with the equatorial portion of an egg in contact with the blade, means for reciprocating the blade at approximately 2000 cycles per minute and with a length of stroke of approximately one-eighth inch, and means for gauging the depth of cut of said scoring blade whereby to score the shell without cutting the membrane of the egg.

GEORGE F. HODSON.
LYMAN L. CAMPBELL.

REFERENCES CITED

The following references are of record in the file of this patent:

UNITED STATES PATENTS

| Number | Name | Date |
| --- | --- | --- |
| 2,018,044 | Weiss | Oct. 22, 1935 |
| 2,067,566 | Field | Jan. 12, 1937 |
| 2,109,438 | Springer | Feb. 22, 1938 |
| 2,126,226 | Smith et al. | Aug. 9, 1938 |
| 2,443,188 | Hodson | June 15, 1948 |